United States Patent
Hehle et al.

(10) Patent No.: US 8,688,352 B2
(45) Date of Patent: Apr. 1, 2014

(54) METHOD FOR AUTOMATICALLY CONTROLLING AN INTERNAL COMBUSTION ENGINE

(75) Inventors: Marc Hehle, Constance (DE); Holger Frank, Friedrichshafen (DE); Michael Willmann, Bermatingen (DE)

(73) Assignee: MTU Friedrichshafen GmbH, Friedrichshafen (DE)

(*) Notice: Subject to any disclaimer, the term of this patent is extended or adjusted under 35 U.S.C. 154(b) by 533 days.

(21) Appl. No.: 12/849,917

(22) Filed: Aug. 4, 2010

(65) Prior Publication Data

US 2011/0035132 A1    Feb. 10, 2011

(30) Foreign Application Priority Data

Aug. 4, 2009   (DE) .................. 10 2009 036 061

(51) Int. Cl.
F02D 28/00     (2006.01)

(52) U.S. Cl.
USPC ............... 701/103; 123/90.11; 123/90.15; 137/554

(58) Field of Classification Search
USPC ............. 123/190.1, 80 B, 79 A, 90.3, 90.28, 123/188.11, 90.11, 90.15, 90.16; 73/114.26, 114.77, 114.79; 701/103, 701/107; 702/33, 150, 151; 137/554; 324/207.11, 207.22–207.26, 226

See application file for complete search history.

(56) References Cited

U.S. PATENT DOCUMENTS

| | | | |
|---|---|---|---|
| 4,458,799 A | 7/1984 | Schueller | |
| 6,405,697 B2* | 6/2002 | Mikame | 123/90.18 |
| 6,443,083 B2 | 9/2002 | Müller | |
| 6,511,354 B1 | 1/2003 | Gonring et al. | |
| 6,550,494 B2* | 4/2003 | Yoneda et al. | 137/554 |
| 6,592,412 B1 | 7/2003 | Geil et al. | |
| 6,633,157 B1* | 10/2003 | Yamaki et al. | 324/207.2 |
| 6,840,200 B2* | 1/2005 | Miller | 123/90.11 |
| 6,978,729 B2 | 12/2005 | Bertetti | |
| 7,121,300 B2* | 10/2006 | Kragl et al. | 137/554 |

(Continued)

FOREIGN PATENT DOCUMENTS

| | | |
|---|---|---|
| CN | 1137462 | 2/2001 |
| CN | 1798685 | 7/2006 |

(Continued)

OTHER PUBLICATIONS

DE 9417650 U1, Jan. 19, 2005, Germany, "Verbrennungskraftmaschine mit einer Messeinrichtung zur Bestimmung von Ventildrehzahlen", TRW Motorkomponenten GmbH & Co.*

(Continued)

*Primary Examiner* — Stephen K Cronin
*Assistant Examiner* — John Zaleskas
(74) *Attorney, Agent, or Firm* — Lucas & Mercanti, LLP; Klaus P. Stoffel

(57) ABSTRACT

A method for automatically controlling an internal combustion engine, in which an axial displacement (s(t)) and an angle of rotation (w(t)) of a gas-exchange valve are measured during a valve stroke. A displacement deviation is computed from the displacement (s(t)) relative to a reference valve, and an angle of rotation deviation is computed from an initial value and an end value of the angle or rotation. The further operation of the internal combustion engine is set on the basis of the displacement deviation and the angle of rotation deviation.

8 Claims, 3 Drawing Sheets

(56) References Cited

U.S. PATENT DOCUMENTS

| | | |
|---|---|---|
| 7,442,100 B2 | 10/2008 | Korhonen et al. |
| 7,712,485 B2 | 5/2010 | Kitten et al. |
| 2007/0208487 A1* | 9/2007 | Seethaler et al. ............. 701/101 |
| 2008/0064273 A1 | 3/2008 | Mizokawa |
| 2009/0082944 A1* | 3/2009 | Frank et al. .................. 701/103 |

FOREIGN PATENT DOCUMENTS

| | | |
|---|---|---|
| DE | 241722 | 12/1986 |
| DE | 3722206 | 1/1989 |
| DE | 4112192 | 10/1991 |
| DE | 94 17 650 | 1/1995 |
| DE | 196 47 412 | 1/1998 |
| DE | 19963476 | 7/2001 |
| DE | 10214685 A1 * | 5/2003 |
| DE | 20309702 U1 * | 9/2003 |
| DE | 102005001552 | 7/2006 |
| DE | 102006042629 | 3/2008 |
| DE | 102008015794 * | 10/2009 |
| EP | 1520782 | 4/2005 |
| EP | 1918533 A1 * | 5/2008 |
| JP | 57135207 A * | 8/1982 |
| JP | 2006033787 A * | 2/2006 |
| JP | 2008201337 | 9/2008 |

OTHER PUBLICATIONS

DE 20309702 U1, Sep. 4, 2003, Germany, "Gauge for valve movement in motor vehicle internal combustion engine, has ferromagnetic target attached to valve shaft and sensor to monitor movement", Mamerow, Bernd.*

* cited by examiner

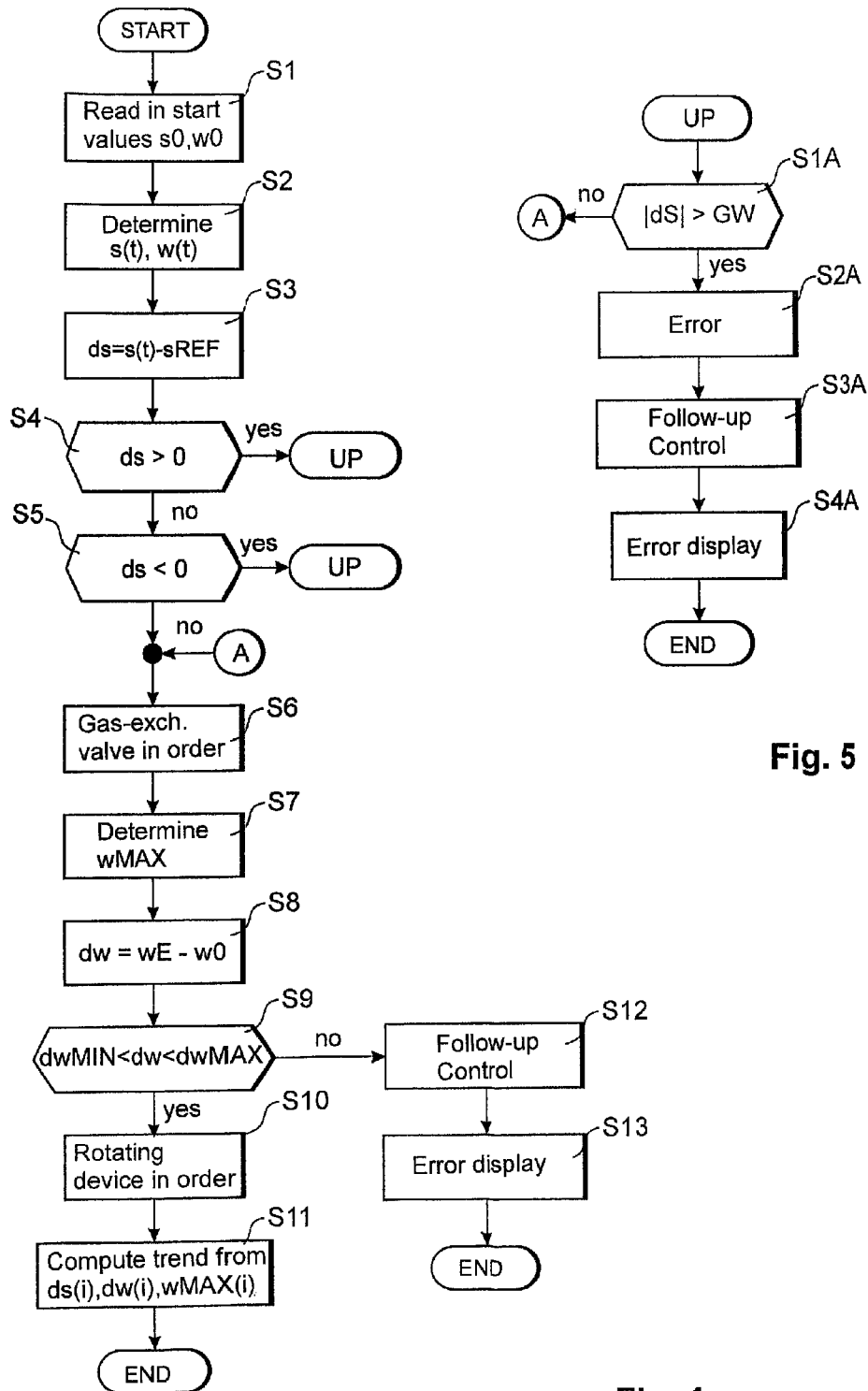

METHOD FOR AUTOMATICALLY CONTROLLING AN INTERNAL COMBUSTION ENGINE

BACKGROUND OF THE INVENTION

The invention concerns a method for automatically controlling an internal combustion engine, in which an axial displacement and an angle of rotation of the gas-exchange valve are continuously measured.

In practice, large diesel engines are delivered without automatic valve clearance compensation. Therefore, after a rigidly prescribed operating time, the valve clearance must be adjusted by a service mechanic in accordance with a maintenance schedule. The boundary conditions, for example, cooling water temperature less than 40° C., and the individual steps are described in the maintenance schedule. First, a hand crank is applied, the cylinder head cover is removed, and the gas-exchange valves are sequentially brought into the closed state by the hand crank. In the closed state, the given actual valve clearance is then measured by a thickness gage. If it deviates from the desired valve clearance, the service mechanic must adjust the actual valve clearance by an adjusting screw until it conforms to the desired valve clearance. In a large diesel engine unit with, for example, sixteen cylinders, this is complicated and cost-intensive and, in the case of a ship, results in greater harbor dues.

To avoid deposits on a gas-exchange valve, it is well known that the gas-exchange valve can be turned by an angle. A rotating device is described, for example, in DE 196 47 412 C1. It is also well known to measure the turning of the gas-exchange valve and to use this measurement to evaluate operability. For example, DE 94 17 650 U1 describes a measuring device of this type, in which a permanent magnet is arranged on the rotating device, and the measuring sensor is arranged in the cylinder head. An unsatisfactory valve rotating device is then to be exchanged.

SUMMARY OF THE INVENTION

The object of the invention is to provide a method for monitoring both the axial displacement and the angle of rotation of the gas-exchange valve.

In addition to continuous measurement of the axial displacement and the angle of rotation at the gas-exchange valve during a valve stroke, the method includes the computation of a deviation of the displacement from a reference value and the computation of a deviation of the angle of rotation from an initial value to an end value. Since the displacement of the gas-exchange valve is determined as a variation with respect to time, the reference value is also predefined as a variation with respect to time. The further operation of the internal combustion engine is then set on the basis of the deviation of the displacement and the deviation of the angle of rotation.

The gas-exchange valve is set as correct when the amount of the displacement deviation is smaller than a predetermined limit. When the gas-exchange valve is correct, the axial displacement of the gas-exchange valve continues to be used as a permissible input value in a variable open-loop valve control. On the other hand, if the amount of the displacement deviation is greater than the limit, an automatic follow-up control is initiated. An automatic follow-up control provides, for example, that the gas-exchange valve is deactivated and checked again after a certain interval of time has passed. Alternatively, a substitute value can be used, and limited further operation can be allowed. The rotating device is set as correct when the deviation of the angle of rotation lies within a predetermined tolerance range. Otherwise, an automatic follow-up control is initiated in this case as well.

To determine a prognosticated service interval, a maximum angle of rotation is determined from the variation of the angle of rotation with respect to time, and, together with the permissible displacement deviations and the permissible angle of rotation deviations, a trend is determined.

All together, the invention offers the advantage that mechanical regulation of the valve clearance becomes unnecessary and that the maintenance intervals are based more closely on need. The simultaneous monitoring of the axial displacement and of the angle of rotation makes it possible to check the correct operation of the gas-exchange valve, i.e., the valve clearance, and the correct operation of the rotating device.

Other features and advantages of the present application will become apparent from the following description of the invention that refers to the accompanying drawings.

BRIEF DESCRIPTION OF THE DRAWING

FIG. 4 shows a program flowchart.
FIG. 5 shows a subroutine.

DETAILED DESCRIPTION OF THE INVENTION

Figure 1:
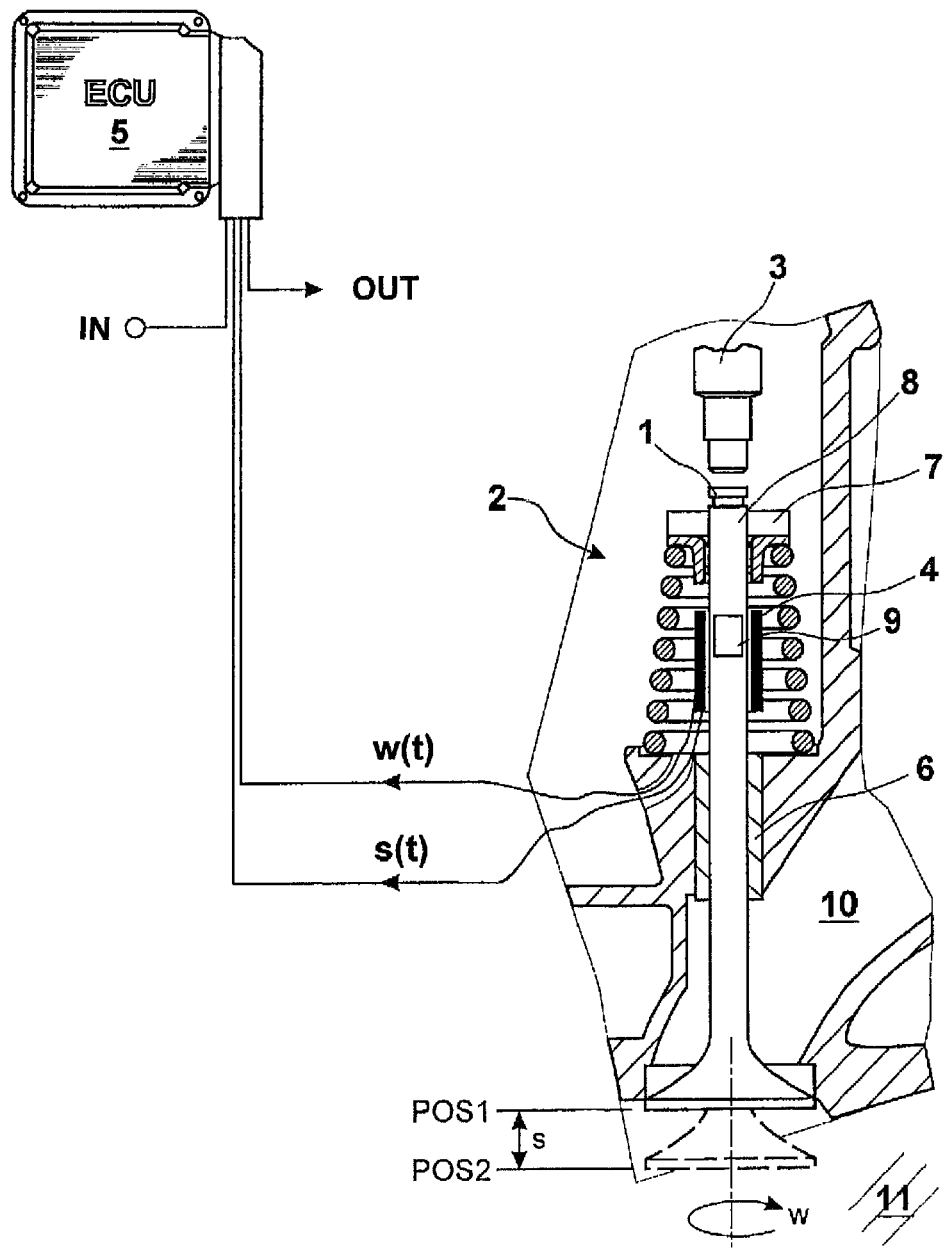
FIG. 1 shows a system diagram.

FIG. 1 shows a system diagram with a combined sensor for measuring the displacement and angle of rotation in a gas-exchange valve 1. The illustrated components are: the gas-exchange valve 1, for example, an exhaust valve; a cylinder head 2; a rocker arm 3 for actuating the gas-exchange valve; the sensor 4; and an electronic control unit (ECU) 5. The gas-exchange valve 1 is mounted in the cylinder head 2 by a guide bush 6 and is actuated by the rocker arm 3. When it is actuated, the gas-exchange valve 1 is simultaneously turned through an angle by a rotating device 7 to prevent deposits on the gas-exchange valve 1. In a first position POS1, the gas-exchange valve 1 completely closes a combustion chamber 11. In a second position POS2, the gas-exchange valve 1 opens a passage from the combustion chamber 11 to an exhaust port 10, through which the exhaust gas then flows, for example, to an exhaust gas turbocharger. The sensor 4 simultaneously detects the position of the gas-exchange valve 1 in the axial direction and the angle of rotation of the gas-exchange valve 1. In a preferred embodiment, this is accomplished by way of a magnetically coded region 9 formed on the valve stem 8. Other types of sensors (inductive, capacitive, optoelectronic) can also be used, although this involves added expense.

The electronic control unit 5 determines the mode of operation of the internal combustion engine. It contains the usual components of a microcomputer system, for example, a microprocessor, interface adapters, buffers and memory components (EEPROM, RAM). Operating characteristics that are relevant to the operation of the internal combustion engine are applied in the memory components in the form of input-output maps/characteristic curves. The electronic engine control unit 5 uses these to compute the output variables from the input variables. The input variables are the displacement as a function of time $s(t)$, the angle of rotation as a function of time $w(t)$, and additional input variables that are combined under the reference symbol IN. Additional input variables IN are, for example, a rail pressure, and engine speed, and a desired power. The output variables of the electronic control unit 5 are combined under the reference symbol OUT. OUT represents additional signals for regulating and controlling the internal combustion engine, for example, an injector control signal for determining an injection start and an injection end.

The general functionality is as follows:
In the initial position, i.e., the closed position, the gas-exchange valve 1 occupies the first position POS1. The first position POS1 is determined by a first geometric location, namely, an initial value for the displacement and an initial value for the angle of rotation. These initial values are read in by the electronic control unit 5. When the gas-exchange valve 1 is actuated, the current displacement and the current angle of rotation are then read in, for example, in a toroidal core memory. The second position POS2 is determined by a second geometric location, namely, a maximum displacement and a maximum angle of rotation. The second position POS2 of the gas-exchange valve 1 is shown in FIG. 1 by a broken line. A valve stroke corresponds to the passage from the first position POS1 to the second position POS2 and back to the first position POS1. The variation of the axial displacement s(t) and the variation of the angle of rotation w(t) are determined over the course of a valve stroke. A deviation of the displacement from the displacement s(t) to a reference value is then computed, and a deviation of the angle of rotation from the initial value of the angle of rotation in the first position POS1 to an end value of the angle of rotation in the second position POS2 is computed. The further operation of the internal combustion engine is then set on the basis of the deviation of the displacement and the deviation of the angle of rotation.

In an embodiment not illustrated here, a local electronics system with independent computing capacity is assigned to the gas-exchange valve 1. The local system undertakes the processing of the axial displacement s(t) and the angle of rotation w(t) and transmits their permissibility or impermissibility to the electronic engine control unit 5. If an error of the gas-exchange valve is detected, the electronic engine control unit 5 then takes on the automatic follow-up control.

Figure 2:
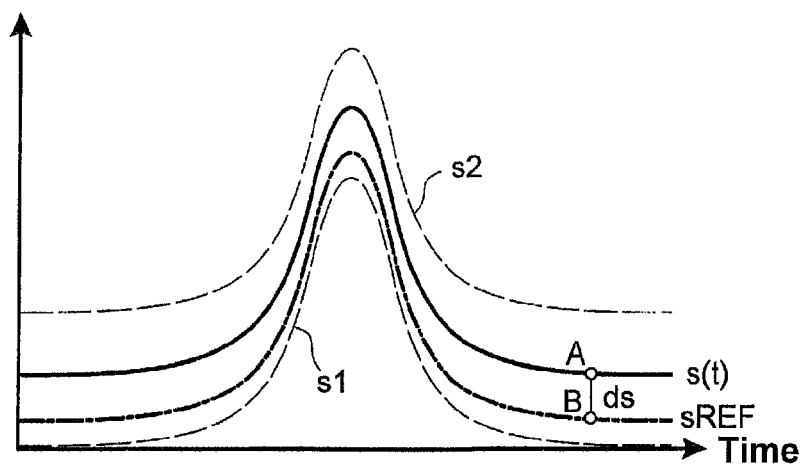
FIG. 2 shows the axial displacement of the gas-exchange valve as a function of time.

FIG. 2 shows the axial displacement of the gas-exchange valve, i.e., the valve stroke, as a function of time. The solid line represents the measured variation of the axial displacement s(t) during a valve stroke. A valve stroke corresponds to the change in position of the gas-exchange valve from the closed state to the completely open state and back to the closed state. A predetermined reference curve sREF is drawn as a dot-dash line. To each measured value s(t) there is a corresponding reference value. For example, the value A has a corresponding reference value B. The difference between value A and reference value B then corresponds to a displacement deviation ds. The broken line s1 denotes a gas-exchange valve that has excessive valve clearance, while the broken line s2 denotes a gas-exchange valve that has insufficient valve clearance.

Figure 3:
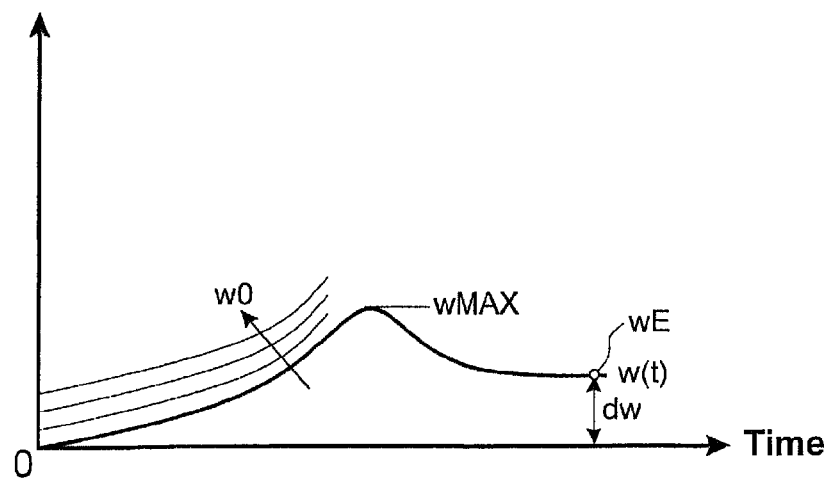
FIG. 3 shows the angle of rotation of the gas-exchange valve as a function of time.

FIG. 3 shows a possible course of the angle of rotation w of a gas-exchange valve as a function of time. The function w(t) characterizes a gas-exchange valve whose initial value w0 lies at the origin of the coordinate system. The angle of rotation w(t) and the axial displacement s(t) are determined synchronously. Since the gas-exchange valve in the first position does not always have the same initial value w0 of the angle of rotation, the function w(t) shifts in the direction of the ordinate. Therefore, FIG. 3 shows, by way of example, segments of three other possible curves of the function w(t). The function of the angle of rotation with respect to time w(t) has a maximum value wMAX and an end value wE. The difference between the end value wE of the angle of rotation and the initial value w0 of the angle of rotation corresponds to the deviation dw of the angle of rotation, and this deviation is then checked for permissibility.

FIG. 4 shows a program flowchart of a main program. FIG. 5 shows a subroutine UP. The description which follows applies to both programs jointly. At S1 the displacement initial value s0 and the angle of rotation initial value w0 are read in. At S2 the current axial displacement as a function of time s(t) and the current angle of rotation as a function of time w(t) are read in. At S3 the deviation ds of the displacement s(t) from a reference value sREF is computed, and at S4 a check is made to determine whether the displacement deviation ds is positive (ds>0). The displacement deviation ds is positive if the valve clearance of the gas-exchange valve is greater than the reference value. If this is determined at S4 (interrogation result S4: yes), then the program branches off to the subroutine UP (FIG. 5). At S1A the absolute value of the deviation is compared with a limit GW. If the valve clearance is elevated but still permissible, i.e., the absolute value of the displacement deviation is less than the limit GW, then the subroutine branches back to point A of the main program (FIG. 4). If, on the other hand, the absolute value of the displacement deviation ds is greater than the limit GW (interrogation result S1A: yes), then at S2A an error is determined. At S3A an automatic follow-up control is then initiated. One possible automatic follow-up control provides for the gas-exchange valve to be deactivated and then rechecked after a certain interval of time. In another possible automatic follow-up control, the gas-exchange valve is deactivated incrementally. After the automatic follow-up control, the operator is notified of the detected error at S4A, and the subroutine is ended.

If it was determined at S4 in the main program that the displacement deviation is not positive (interrogation result S4: no), then at S5 a check is made to determine whether the displacement deviation ds is negative (ds<0). The displacement deviation ds is negative if the valve clearance is insufficient. If this is found to be the case, then the program branches off to the subroutine UP, in which, at S1A, the absolute value of the deviation ds is compared with the limit GW. If the valve clearance is reduced but still permissible, i.e., the absolute value of the displacement deviation is less than the limit GW, then the subroutine branches back to point A of the main program. If, on the other hand, the absolute value of the displacement deviation ds is greater than the limit (interrogation result S1A: yes), then at S2A an error is determined. At S3A an automatic follow-up control is then initiated. One possible automatic follow-up control provides for the gas-exchange valve to be deactivated and then rechecked after a certain interval of time. In another possible automatic follow-up control, the gas-exchange valve is deactivated incrementally. After the automatic follow-up control, the operator is notified of the detected error at S4A, and the subroutine is ended.

If it was determined at S5 that the displacement deviation ds is not negative (interrogation result S5: no), then at S6 the gas-exchange valve is set as correct. Then at S7 the maximum value wMAX is determined from the variation of the angle of rotation with respect to time w(t). At S8 the deviation dw of the angle of rotation is computed from the initial value w0 and the end value wE of the angle of rotation w, and this deviation dw is evaluated at S9. If the deviation dw of the angle of rotation does not lie within a tolerance range formed from the two limits dwMIN and dwMAX, then at S12 an automatic follow-up control is initiated, and at S13 the operator is notified of the error. The main program is then ended. If, on the other hand, it was recognized at S9 that the deviation dw of the angle of rotation is permissible (interrogation result S9: yes), then at S10 the rotating device is set as correct. At S11 the valid displacement deviations ds(i), the valid angle of rotation deviations dw(i), and the maximum values wMAX(i) of the angle of rotation are used to compute a trend, where i represents a counting variable. A prognosticated service interval can in turn be derived from this trend. A suitable method for this is described, for example, in DE 199 16 994 C1. The program flow is then ended.

Although the present invention has been described in relation to particular embodiments thereof, many other variations and modifications and other uses will become more apparent to those skilled in the art. It is preferred, therefore, that the present invention be limited not by the specific disclosure herein, but only by the appended claim.

The invention claimed is:

1. A method for automatically controlling an internal combustion engine, comprising the steps of: directly measuring an axial displacement (s(t)) and an angle of rotation (w(t)) of a gas-exchange valve during a valve stroke with a combined sensor; computing a displacement deviation (ds) from the axial displacement (s(t)) relative to a reference value (sREF); computing an angle of rotation deviation (dw) from an initial value (w0) and an end value (wE) of the angle of rotation; and setting further operation of the internal combustion engine based on the displacement deviation (ds) and the angle of rotation deviation (dw).

2. The method in accordance with claim 1, including recognizing the gas-exchange valve as correct and setting the axial displacement (s(t)) of the gas-exchange valve as a permissible input value for variable valve control if an absolute value of the displacement deviation (ds) is less than a limit (GW).

3. The method in accordance with claim 2, further including initiating automatic follow-up control if the absolute value of the displacement deviation (ds) is greater than the limit (GW).

4. The method in accordance with claim 1, further including recognizing a rotating device as correct and setting the angle of rotation (w(t)) of the gas-exchange valve as correct if the angle of rotation deviation (dw) lies within a tolerance range (dwMIN, dwMAX).

5. The method in accordance with claim 4, further including initiating automatic follow-up control if the angle of rotation deviation (dw) lies outside of the tolerance range (dwMIN, dwMAX).

6. The method in accordance with claim 1, including determining a maximum angle of rotation (wMAX) from the angle of rotation (w(t)) during a valve stroke.

7. The method in accordance with claim 6, further including computing a trend using permissible displacement deviations (ds(i), i=1 . . . n), permissible angle of rotation deviations (dw(i)), and the maximum angles of rotation (wMAX(i)).

8. The method in accordance with claim 7, including determining a prognosticated service interval based on the trend.

* * * * *